(12) United States Patent
Ikeda et al.

(10) Patent No.: US 7,671,937 B2
(45) Date of Patent: Mar. 2, 2010

(54) POLARIZING PLATE

(75) Inventors: Yoshinori Ikeda, Hino (JP); Takashi Shiro, Hino (JP)

(73) Assignee: Teijin Limited, Osaka (JP)

( * ) Notice: Subject to any disclaimer, the term of this patent is extended or adjusted under 35 U.S.C. 154(b) by 158 days.

(21) Appl. No.: 11/912,599

(22) PCT Filed: Apr. 25, 2006

(86) PCT No.: PCT/JP2006/309124

§ 371 (c)(1),
(2), (4) Date: Oct. 25, 2007

(87) PCT Pub. No.: WO2006/120969

PCT Pub. Date: Nov. 16, 2006

(65) Prior Publication Data

US 2009/0128745 A1 May 21, 2009

(30) Foreign Application Priority Data

| Apr. 26, 2005 | (JP) | ............................. | 2005-127707 |
| Apr. 26, 2005 | (JP) | ............................. | 2005-127708 |
| Apr. 28, 2005 | (JP) | ............................. | 2005-131483 |
| Apr. 28, 2005 | (JP) | ............................. | 2005-131484 |
| May 30, 2005 | (JP) | ............................. | 2005-156891 |
| Sep. 22, 2005 | (JP) | ............................. | 2005-275496 |

(51) Int. Cl.
*G02F 1/13363* (2006.01)
*G02B 1/08* (2006.01)

(52) U.S. Cl. ......................................... 349/96; 359/500

(58) Field of Classification Search ........................ None
See application file for complete search history.

(56) References Cited

U.S. PATENT DOCUMENTS

| 3,607,565 A | | 9/1971 | Eaton | |
| 3,610,729 A | | 10/1971 | Rogers | |
| 5,251,065 A | * | 10/1993 | Uetsuki | ........................ 359/454 |
| 5,486,949 A | | 1/1996 | Schrenk et al. | |
| 5,867,316 A | * | 2/1999 | Carlson et al. | ............... 359/500 |

FOREIGN PATENT DOCUMENTS

| JP | 47-6585 B | 4/1972 |
| JP | 51-28748 B | 8/1976 |
| JP | 62-54904 B2 | 11/1987 |
| JP | 63-196738 A | 8/1988 |
| JP | 6-130223 A | 5/1994 |
| JP | 8-220639 A | 8/1996 |
| JP | 9-170175 A | 6/1997 |
| JP | 10-142423 A | 5/1998 |
| JP | 10-153706 A | 6/1998 |
| JP | 2000-8247 A | 1/2000 |
| JP | 2003-207622 A | 7/2003 |
| JP | 3526830 B2 | 2/2004 |
| JP | 2004-144838 A | 5/2004 |
| JP | 2006-126313 A | 5/2006 |
| WO | 2005/008302 A1 | 1/2005 |

OTHER PUBLICATIONS

Henri Jagt, Yvo Dirix, Rifat Hikmet and Cees Bastiaansen; Linear Polarizers Based on Polymer Blends: Oriented Blends of Poly(Ethylene-2,6-Naphthalenedicarboxylate) and a Poly(Styrene/Methylmethacrylate)Copolymer; Journal of Applied Physics, vol. 37, (1998) pp. 4389-4392.

Yuichi Sadamitsu; The Monthly Magazine "Display" p. 39, Issued in Apr. 2005, Partial English language translation.

Toshiyuki Watanabe and Shigeyoshi Ohtsuki; Technology Research Association for Advanced Display Materials; the monthly magazine "Display" p. 13, issued in Apr. 2005, Partial English language translation.

* cited by examiner

*Primary Examiner*—Omar Rojas
(74) *Attorney, Agent, or Firm*—Sughrue Mion, PLLC

(57) ABSTRACT

A polarizing plate comprising (a) a layer composed of a plurality of polyvinyl alcohol fibers adsorbing a dichroic pigment and having an aspect ratio of 10 or more, which are arranged in a planar form in one direction, or the above layer (a) and (b) a layer composed of a plurality of fibers having an aspect ratio of 10 or more and a difference between the refractive index of fiber in long axis and the refractive index of fiber in short axis of 0.05 or more and not adsorbing a dichroic pigment, which are arranged in a planar form in one direction, and/or (b') a plurality of fibers having an aspect ratio of 10 or more and a difference between the refractive index of fiber in long axis and the refractive index of fiber in short axis of less than 0.05 and not adsorbing a dichroic pigment, which are arranged in a planar form in one direction, and (c) an optically transparent resin.

18 Claims, No Drawings

POLARIZING PLATE

CROSS REFERENCE TO RELATED APPLICATIONS

This application is a National Stage of International Application No. PCT/JP2006/309124 filed on Apr. 25, 2006, claiming priority based on Japanese Patent Application Nos. 2005-127707, 2005-127708, 2005-131483, 2005-131484, 2005-156891, and 2005-275496, filed Apr. 26, 2005, Apr. 26, 2005, Apr. 28, 2005, Apr. 28, 2005, May 30, 2005, and Sep. 22, 2005, respectively, the contents of all of which are incorporated herein by reference in their entirety.

TECHNICAL FIELD

The present invention relates to a polarizing plate having a brightness increasing function, an optical component comprising the polarizing plate and a liquid crystal display device.

BACKGROUND ART

As a polarizing plate for use in liquid crystal display devices, a polarizing plate manufactured by forming a tri-acetyl cellulose (to be abbreviated as TAC hereinafter) film as a protective film on one side or both sides of a monoaxially oriented polyvinyl alcohol (to be abbreviated as PVA hereinafter) film colored with iodine as a polarizer, a polarizing plate manufactured by forming an acrylic resin coating layer on one side of a polarizer, or a polarizing plate manufactured by forming a norbornene or polycarbonate retardation film on one side of a polarizer in place of TAC is used. However, as the above polarizing plates are classified into a group of absorption type polarizing plates which transmit only light in the transmission-axis direction of the polarizing plate and absorb light of other components, a liquid crystal display device having a light transmittance of 50% (maximum light transmittance of 46% because the internal surface reflectance is 4%) under ideal conditions and increased brightness and making efficient use of a backlight is targeted.

Liquid crystal display devices are used in a wide variety of products from small-sized products such as calculators, wrist watches, mobile phones and digital cameras to middle-sized products such as PDA, car navigation systems and POS systems and large-sized products such as liquid crystal monitors for personal computers and liquid crystal TVs. Demand for members having higher quality and more functions for use in the liquid crystal display devices is growing.

A reflection type polarizing plate making use of optical interference is available as a polarizing plate having a brightness increasing function. U.S. Pat. Nos. 3,610,729 and 5,486,949 disclose a polarizer making use of the interference of a multi-layer film having birefringence and a method of separating polarization with an oriented multi-layer film consisting of two different polymer films which differ in refractive index. Journal of Applied Physics, vol. 37, pp. 4389, 1998 proposes a method of separating polarization by making use of a simple polymer blend though its principle is the same as above. Recently, WO 2005/8302 has reported a method making use of a fiber in place of the polymer blend. A reflection type polarizing plate in the polarization separation system reflects a non-transmitting polarization component. The reflected light is multiply reflected by a diffusion reflective film installed on the back light side of a liquid crystal display device repeatedly, thereby making it possible to take out light corresponding to light in the transmission-axis direction of the polarizing plate again and to realize a transmittance of 60% or more. However, when the reflection type polarizing plates are installed before and after the liquid crystal cell, color cannot be displayed accurately due to the multiple reflection of light reflected in the liquid crystal cell. Therefore, it is used only on the backlight side. As described in the above WO2005/8302 and at page 13 of the monthly magazine "Display" issued in April 2005, to realize a reflection type polarizing plate, the refractive index of a polymer to be blended and the refractive index of a substrate as a bulk must be made exactly the same, the shapes and arrangements of the blend polymer and the fiber must be controlled precisely, it is extremely difficult to achieve the same degree of polarization (99.9% or more) as that of the current polarizing plate, and the contrast of a liquid crystal display device cannot be maintained at a satisfactory level. Therefore, the reflection type polarizing plate is used in combination with an absorption type polarizing plate to attain only the function of increasing brightness in the current situation. In this case, the reflection type polarizing plate is not called "polarizing plate" but treated as a brightness increasing film and actually marketed under the trade name of D-BEF from 3M Co., Ltd. However, as it is necessary to secure polarization characteristics over a wide visible range even in D-BEF, 400 to 800 layers in total are assembled together. It is technically difficult to carry out the control of the thickness of each layer and the assembly of several hundreds of polymer films and further to control the refractive index of each layer.

Since durability required for the polarizing plate is extremely high, an absorption type polarizing plate using iodine is unsatisfactory in terms of durability, especially moist heat resistance, and the service life of a liquid crystal display device comprising this polarizing plate is limited by the characteristic properties of the polarizing plate.

To improve the durability, the monthly magazine "Display" issued in April, 2005 reports at page 39 a dye-based polarizing plate comprising a dichroic dye as a polarizer in place of iodine. Although the durability of the polarizer itself is improved as compared with that of a polarizing plate comprising iodine adsorbed thereto and aligned, a TAC film which is the protective film of the polarizing plate shrinks and applies shrinkage stress to a liquid crystal panel with the result of the deterioration of image quality or the corrosion of the TAC film itself.

As described above, to improve the transmittance of the polarizing plate, a reflection type polarizing plate is used, or an absorption type polarizing plate and a reflection type polarizing plate, that is, two brightness increasing films are used so as to increase the brightness of a liquid crystal display device. When a reflection type polarizing plate is used alone, the contract of the liquid crystal display device may not be maintained at a satisfactory level due to a low degree of polarization, and when a brightness increasing film is used alone, it cannot have a polarizing function and has a large number of technically difficult points, thereby boosting its costs. Therefore, a polarizing plate alone having a high degree of polarization and a high transmittance (having a brightness increasing function) is not obtained yet.

When a TAC film is used as a polarizing plate protective film, the improvement of the durability of the polarizing plate has not been observed until now.

In a reflection type or semi-transmission reflection type small- to medium-sized liquid crystal display device, a λ/4 retardation film is joined to a polarizing film at about 45°. This is essential in order to obtain display by reflection. The polarizing film and the retardation film are each cut into a chip having a specific angle and these chips are joined together. As for the oblique stretching of the polarizing film, JP-A 2003-

207622 and JP-A 2004-144838 disclose a technology for a polarizing film having a transmission axis in an oblique direction by using a polarizer composed of a PVA film which is obliquely stretched. However, to stretch the polarizer composed of a PVA film, the draw ratio must be 4 to 8 times and a bulky apparatus is required. In the oblique stretching of the film, as the stretched film is biaxially oriented, the degree of orientation is low, thereby making it impossible to obtain the same polarization performance as that of a polarizing film composed of a polyvinyl alcohol film which is monoaxially stretched in a longitudinal direction. Since a TAC film is used as the protective film of the polarizer of a polarizing film, problems such as the deterioration of image quality by shrinkage which depends on the TAC film and the corrosion of the TAC film itself still remain.

In the reflection type or half-transmission reflection type liquid crystal display device, a liquid crystal display device is constructed by cutting a polarizing film into a chip having a specific angle and joining it. Therefore, a roll of the polarizing film cannot be joined to a roll of a retardation film, and the process becomes very complicated. Although a technology for stretching a polarizer composed of a PVA film obliquely is now under study, a bulky apparatus is required and the same polarization performance as that of a polarizing film composed of a monoaxially oriented polyvinyl alcohol film cannot be obtained. Therefore, a liquid crystal display device comprising a PVA polarizer is not implemented yet. When a TAC film is used as the protective film of a polarizing film, the improvement of the durability of the polarizing film has not been observed until now.

As a latent problem in the liquid crystal display device, an image displayed by the device changes according to the view direction. One of the causes of this is a polarizing plate. That is, the polarizing plate is made of a monoaxially oriented film and this is caused by the change of the angle formed by the absorption axes of two polarizing plates arranged in a cross nicol state. As another cause, when the image is seen from above the polarizing plate, or when it is seen from a plane orthogonal to the polarizing plate and a plane including the transmission axis or absorption axis of the polarizing plate, the angle formed by the absorption axes of the two polarizing plates is fixed at 90°, and black can be formed by the polarizing plates. However, when seen from the plane orthogonal to the polarizing plate and a plane not including the transmission axis and the absorption axis of the polarizing plate (especially 45° direction), the angle formed by the absorption axes of the two polarizing plates is larger than 90° by changing the angle of observation, thereby causing light passage.

To compensate for a defect in view angle characteristics caused by the polarizing plate, a technology for inserting a biaxial retardation film is disclosed by JP-A 10-142423 and Japanese Patent No. 3526830. With this technology, a wide view angle polarizing plate which has the function of making the polarization state of light passing through a polarizer when light is input obliquely equal to the polarization state when light is input vertical to the retardation film, compensates for a change in the optical properties of the polarizer and can provide a liquid crystal display device having a wide view angle can be obtained. However, the biaxial retardation film for realizing these characteristic properties must control Nz which is birefringence and therefore, a special and difficult processing technology for stretching a monoaxially oriented film in the thickness direction of the film by shrinking a thermally shrinkage film which is joined to both sides of the monoaxially oriented retardation film is required. Therefore, the retardation film has problems such as low productivity due to low yield, a very expensive material, and increases in the number of the materials which must be used to join it to a polarizing plate and the number of processes.

To improve the view angle characteristics of the polarizing plate, the technology for inserting a biaxial retardation film is used. However, the difficulty of the process, and increases in the number of materials and the number of processes boost the costs of members, and a method for improving the view angle characteristics with the polarizing plate alone is not realized yet.

DISCLOSURE OF THE INVENTION

It is an object of the present invention to provide a polarizing plate having high brightness while retaining the same optical properties as those of existing polarizing plates.

It is another object of the present invention to provide a novel polarizing plate which does not comprise a triacetyl cellulose film as a film for protecting the polarizing plate and has improved durability, especially moist heat resistance, unlike conventional polarizing plates.

It is still another object of the present invention to provide a wide view angle polarizing plate which has greatly improved view angle characteristics by itself.

It is a further object of the present invention to provide a polarizing plate roll which can be joined to a roll of a retardation film while retaining the same optical properties as those of existing polarizing films.

It is a still further object of the present invention to provide an optical component having another optical layer showing another optical function different from polarization on the above polarizing plate of the present invention.

It is a still further object of the present invention to provide a liquid crystal display device having the above optical component of the present invention.

Other objects and advantages of the present invention will become apparent from the following description.

According to the present invention, firstly, the above objects and advantages of the present invention are attained by a polarizing plate (may be referred to as "first polarizing plate of the present invention" hereinafter) comprising (a) a plurality of polyvinyl alcohol fibers adsorbing a dichroic pigment and having an aspect ratio of 10 or more, which are arranged in a planar form in one direction, (b) a plurality of fibers having an aspect ratio of 10 or more and a difference between the refractive index of fiber in long axis and the refractive index of fiber in short axis of 0.05 or more and not adsorbing a dichroic pigment, which are arranged in a planar form in one direction, and (c) an optically transparent resin, wherein the one direction where the plurality of fibers (a) are arranged and the one direction where the plurality of fibers (b) are arranged are the same or orthogonal to each other, when they are the same, the refractive index of fiber in short axis of the plurality of fibers (b) and the refractive index of the optically transparent resin (c) become almost the same, and when they are orthogonal to each other, the refractive index of fiber in long axis of the plurality of fibers (b) and the refractive index of the optically transparent resin (c) become almost the same.

According to the present invention, secondly, the above objects and advantages of the present invention are attained by a polarizing plate (may be referred to as "second polarizing plate of the present invention" hereinafter) comprising (a) a plurality of polyvinyl alcohol fibers adsorbing a dichroic pigment and having an aspect ratio of 10 or more, which are arranged in a planar form in one direction, or the fibers (a) and (b') a plurality of fibers having an aspect ratio of 10 or more and a difference between the refractive index of fiber in long axis and the refractive index of fiber in short axis of less than 0.05 and not adsorbing a dichroic pigment, which are arranged in a planar form in one direction, and (c) an optically transparent resin, wherein the average value of the refractive index of fiber in long axis and the refractive index of fiber in short axis of the fibers (b') and the refractive index of the optically transparent resin (c) are almost the same.

According to the present invention, thirdly, the above objects and advantages of the present invention are attained by the first or second polarizing plate of the present invention, wherein the above plurality of fibers (a) are wavy in the one direction where the fibers (a) are arranged and the thickness direction of the polarizing plate.

According to the present invention, in the fourth place, the above objects and advantages of the present invention are attained by a polarizing plate roll which is a roll of the first or second polarizing plate, wherein the directions of the transmission axis and the absorption axis of the polarizing plate, the winding direction of the roll and a direction orthogonal to the winding direction are not the same.

According to the present invention, in the fifth place, the above objects and advantages of the present invention are attained by an optical component comprising a polarizing layer composed of the above first polarizing plate of the present invention and another optical layer showing another optical function different from polarization, wherein when the plane where the plurality of fibers (a) are arranged and the plane where the plurality of fibers (b) are arranged are overlapped with each other in the thickness direction of the polarizing plate, the above another optical layer is formed on the plane where the plurality of fibers (a) are arranged.

According to the present invention, in the sixth place, the above objects and advantages of the present invention are attained by an optical component comprising a polarizing layer composed of the above second polarizing plate of the present invention and another optical layer showing another optical function different from polarization.

Further, according to the present invention, finally, the above objects and advantages of the present invention are attained by a liquid crystal display device comprising the above optical component of the present invention.

BEST MODE FOR CARRYING OUT THE INVENTION

A description is first given of the first polarizing plate of the present invention.

[Polyvinyl Alcohol Fibers (a)]

The polyvinyl alcohol (PVA) fibers used in the polarizing plate of the present invention are fibers or a fibrous body formed from PVA or a PVA derivative. Examples of the PVA derivative include polyvinyl formal, polyvinyl acetal, and PVA, polyvinyl formal and polyvinyl acetal modified by an olefin such as ethylene or propylene, an unsaturated carboxylic acid such as acrylic acid, methacrylic acid or crotonic acid, or alkyl ester or acrylamide thereof. The polymerization degree of PVA or its derivative is about 1,000 to 40,000 and the saponification degree is about 80 to 100 mol %. To use it as a polarizer, since a device having higher durability is obtained as the polymerization degree and saponification degree of PVA or its derivative increases, PVA or its derivative having a polymerization degree of 1,200 to 30,000 and a saponification degree of 90 to 100 mol % is preferred, and PVA or its derivative having a polymerization degree of 1,500 to 20,000 and a specification degree of 98 to 100 mol % is more preferred.

A plasticizer may be mixed with the above PVA fibers. The plasticizer is, for example, a polyol or condensate thereof as exemplified by glycerin, diglycerin, triglycerin, ethylene glycol, propylene glycol and polyethylene glycol. The amount of the plasticizer is not particularly limited but preferably 20 wt % or less based on the total of PVA and the plasticizer. Additives such as an antioxidant, ultraviolet light absorber, crosslinking agent and surfactant may be further contained in the PVA fibers.

As means of processing PVA into fibers (spinning method), a commonly used process such as dry, wet or dry-wet process may be employed. In these processes, a solution of PVA dissolved in the following solvent may be used to manufacture the fibers (spinning). Examples of the solvent include water, dimethyl sulfoxide, dimethyl formamide, dimethyl acetamide, N-methylpyrrolidone, 1,3-dimethyl-2-imidazolidinone, ethylene diamine, diethylene triamine, diethylene triamine, and polyhydric alcohols such as glycerin, ethylene glycol and 3-methylpentane-1,3,5-triol which are used alone or in combination of two or more. An aqueous solution of an inorganic salt such as zinc chloride, magnesium chloride, rhodan calcium or lithium bromide and an aqueous solution of isopropanol all of which can dissolve PVA may be used.

The PVA fibers used in the present invention are stretched. This stretching may be carried out before, simultaneously with or after dyeing with a dichroic pigment. As a matter of course, it may be carried out in a plurality of stages. When the fibers are dyed with a dichroic pigment after they are stretched, the adsorbed dichroic pigment is aligned along the stretching axis. In this dyeing step, the dichroic pigment is aligned along the stretching axis and adsorbed. Meanwhile, the dichroic pigment may be impregnated simultaneously with dyeing, or after dyeing, with the dichroic pigment, during the period from the preparation of a spinning stock solution right before stretching with dry heat, or after stretching with dry heat. To apply the dichroic pigment to the PVA-based fibers, a roller touch, immersion or bow spacer contact method is employed.

As for the draw ratio of the PVA fibers used in the present invention, the maximum draw raw can be about 10 to 30 times. The maximum draw ratio means a draw ratio when fibers are broken during dry heat stretching. However, when the draw ratio is close to the maximum draw ratio, voids are formed in the inside of each PVA fiber, whereby whitening caused by the irregular reflection of light is seen and the transmittance and the polarization degree are degraded disadvantageously. When the draw ratio is low, the alignment of the molecular chain and the dichroic pigment becomes unsatisfactory, thereby reducing strength and the polarization degree. Therefore, the draw ratio of the PVA fibers is preferably 40 to 80%, more preferably 45 to 75%, most preferably 50 to 70% of the maximum draw ratio. PVA fibers to which the dichroic pigment is adsorbed and aligned by this stretching are obtained.

As for the thickness of the above PVA fibers, the average diameter is preferably 0.7 to 100 μm, more preferably 0.8 to 80 μm, much more preferably 1 to 50 μm. When the PVA fibers are as thin as less than 0.7 μm, it is difficult to spin and stretch the fibers, and the fibers are readily subjected to surface scattering at a wavelength of a visible range which depends on the size of the fibers, thereby making it difficult to display a uniform color. When the fibers are as thick as more than 100 μm and arranged in one direction to form a polarizing plate having a desired thickness, a space is formed between them because the fibers are too thick, thereby causing light leakage and making it difficult to realize a high degree of polarization.

An assembly of PVA fibers to which a dichroic pigment is adsorbed and aligned does not need to be uniform in the size of fiber, and an assembly of a mixture of thin fibers and thick fibers which are arranged in one direction without a space and achieve a high degree of polarization as a polarization function may be used. The sectional form of each fiber may be circular, elliptic, triangular, quadrangular, pentagonal, hexagonal or polygonal, and the sectional form does not matter if a high polarization degree as a polarization function is achieved when the fibers are arranged in one direction without a space. The sectional forms of the fibers of an assembly of PVA fibers do not need to be the same, and the assembly may be composed of fibers having different shapes. However, when the fibers have the same shape, it is not necessary to adjust the mixing ratio to obtain a homogeneous assembly. The aspect ratio of the PVA fiber is 10 or more, preferably 20 or more, more preferably 100 or more. The aspect ratio is the ratio of the length to the short axis of the fiber. The long axis is the lengthwise direction of the fiber and the short axis is the section direction (vertical direction) to the long axis. When the sectional form of the fiber is polygonal, the short axis is defined as the diameter of a circle circumscribing to the polygon. When the aspect ratio of the PVA fiber is less than 10 and the fibers are arranged in the long-axis direction and aligned, uniform alignment is hardly obtained. Since the PVA fibers are preferably treated as a fabric, infinitely long fibers are preferred but the fibers must have a length of at least 1 m, preferably 10 m or more, more preferably 100 m or more.

The number of PVA fibers depends on the thickness of each fiber and is not particularly limited if the object and effect of the present invention are attained. The density of the fibers is, for example, 1,000,000 to 25,000,000/cm$^2$. In order to improve the adhesion of the PVA fibers to the optically transparent resin, the surface of each fiber may be subjected to adhesion treatments such as corona treatment.

The above PVA fibers are arranged in almost a planar form in one direction. For arrangement, the fibers are arranged in one layer, that is, monofilaments are preferably arranged in a planar form, or two or more layers in one direction. As for the optimal number of layers, it is possible to obtain relatively high polarization performance with one layer but it is extremely difficult to arrange PVA fibers in one layer without a space. When PVA fibers are used, the number of layers is preferably 2 to 100, more preferably 3 to 100 layers, most preferably 5 to 100.

[Fibers (b) Having a Difference Between the Refractive Index of Fiber in Long Axis and the Refractive Index of Fiber in Short Axis of 0.05 or More]

The fibers having a difference between the refractive index of fiber in long axis and the refractive index of fiber in short axis of 0.05 or more and not adsorbing a dichroic pigment are laminated in one layer or two layers as an assembly. The fibers are made of a material which has substantially no absorption or little absorption at a visible range and substantially no defect such as a void, is highly oriented by stretching to achieve the above refractive index difference and generates birefringence (phase difference) effectively. Examples of this fiber material include polyolefin-vinyl-based fibers such as polyethylene, polytetrafluoroethylene, polypropylene, polyvinyl alcohol, polyvinyl chloride, polyacrylonitrile and poly (4-methyl-1-pentene), aliphatic polyamide-based fibers such as nylon 6, nylon 66 and nylon 46, aromatic polyamide-based fibers (aramide fibers) such as poly(m-phenyleneisophthalamide) and poly(p-phenyleneterephthalamide), polyester-based fibers such as polyethylene terephthalate, polyethylene naphthalate and poly-ε-caprolactone, aromatic liquid crystal polyester-based fibers, hetero atom-containing fibers such as poly(p-phenylenebenzobisoxazole), poly(p-phenylenebenzobisthiazole), polybenzimidazole, polyphenylenesulfide, polysulfone, polyether sulfone and polyether ether ketone, polyimide-based fibers such as polypyromellitimide, cellulose-based fibers such as rayon, acrylic fibers such as poly (methylmethacrylate), polycarbonate-based fibers and urethane-based fibers. Out of these, fibers made of polymers having an aromatic ring such as benzene ring or naphthalene ring are preferred.

To improve adhesion to the optically transparent resin, the surface of each fiber may be subjected to adhesion treatments such as corona treatment. Further, to improve the birefringence of the fiber, the fiber may contain a filler having shape anisotropy such as a low molecular weight liquid crystal compound or whisker, or a multi-filament type polymer fiber with mutually alignment may be used.

Examples of the above low molecular weight liquid crystal compound include compounds having a biphenyl-based, phenylbezoate-based, cyclohexylbenzene-based, azoxybenzene-based, azobenzene-based, azomethine-based, terphenyl-based, biphenylbenzoate-based, cyclohexylbiphenyl-based, phenylpyrimidine-based, cyclohexylpyrimidine-based or cholesterol-based compound as a mesogen, that is, the core unit for developing liquid crystals in the molecular structure. When the low molecular weight liquid crystal compounds are aligned in the long-axis direction of the fiber, they may be dissolved in the fiber or existent as a domain. When they are existent as a domain, the diameter of the domain must be 0.2 μm or less in order to remove the influence of scattered linear polarization which vibrate in the long-axis direction of the fiber.

Examples of the above whisker include sapphire, silicon carbide, boron carbide, aluminum nitrate, graphite, potassium titanate, polyoxymethylene, poly(p-oxybenzoyl) and poly(2-oxy-naphthoyl). The average diameter of the section of the whisker is preferably in the range of 0.05 to 0.2 μm. When the average diameter of the whisker is larger than 0.2 μm, its polarization function deteriorates due to the influence of scattered linear polarization which vibrates in the long-axis direction of the fiber like above.

As for the thickness of the fibers, the average diameter is preferably 0.7 to 100 μm, more preferably 0.8 to 80 μm, much more preferably 1 to 50 μm. When the fibers are as thin as less than 0.7 μm, it is difficult to spin and stretch the fibers, and the fibers are readily subjected to surface scattering at a wavelength of a visible range which greatly depends on the size of the fibers, thereby making it difficult to display a uniform color. When the fibers are as thick as more than 100 μm and arranged in one direction to form a polarizing plate having a desired thickness, a space is formed between them because the fibers are too thick, thereby causing light passage and making it difficult to realize a high degree of polarization.

The fibers having a difference the refractive index of fiber in long axis and the refractive index of fiber in short axis of 0.05 or more do not need to be substantially uniform in thickness, and an assembly of a mixture of thin fibers and thick fibers may be used if a high polarization degree as a polarization function is achieved when they are arranged in one direction without a space. The sectional form of each fiber may be circular, elliptic, triangular, quadrangular, pentagonal, hexagonal or polygonal, and the sectional form does not matter if a high polarization degree as a polarization function is achieved when the fibers are arranged in one direction without a space. The sectional forms of the fibers do not need to be the same, and the assembly may be composed of fibers having different shapes. However, when the fibers have the same shape, it is not necessary to adjust the mixing ratio to obtain a homogeneous assembly. The aspect ratio of the fiber is 10 or more, preferably 20 or more, more preferably 100 or more.

The fibers are basically arranged in a planar form in one direction. The fibers are preferably arranged in one layer, or two or more layers in one direction. As for the optical number of layers, though it is possible to obtain relatively high polarization performance with one layer, it is extremely difficult to arrange the fibers in one layer without a space. When these fibers are used, the number of layers is preferably 2 to 100, more preferably 3 to 100, most preferably 5 to 100.

Since the fibers are treated as a fabric, infinitely long fibers are preferred but the fibers must have a length of at least 1 m, preferably 10 m or more, more preferably 100 m or more.

The above fibers in the present invention are existent on one side of the PVA fibers and have a difference the refractive index of fiber in long axis and the refractive index of fiber in short axis of 0.05 or more. The one direction where the fibers are arranged and the one direction where the PVA fibers are arranged are the same or orthogonal to each other. The expression "on one side" includes a case where the fibers are placed on the PVA fibers or under the PVA fibers, or the fibers and the PVA fibers are woven into a fabric.

[Dichroic Pigment, Method of Dyeing PVA Fibers]

The polarizer in the present invention is manufactured by adsorbing iodine as a dichroic pigment or a dichroic dye to the PVA fibers and aligning them.

When the dichroic pigment is iodine, an aqueous solution of iodine may be used, such as an aqueous solution containing iodine ions by means of iodine and a dissolution aid such as potassium iodide. The concentration of iodine is preferably about 0.01 to 0.5 wt % and the concentration of the potassium iodide is preferably 0.01 to 10 wt %. For dyeing with iodine, the temperature of the iodine solution is, for example, 20 to 50° C., and the immersion time is, for example, 10 to 300 sec. The iodine content of the PVA fiber is preferably adjusted to 1 to 4 wt % to ensure that the polarizer shows a high degree of polarization. For dyeing with iodine, the concentration of the iodine solution, the immersion temperature of the PVA fibers in the iodine solution, the immersion time etc. are controlled so as to adjust the iodine content of the PVA fiber to the above range. The PVA fibers dyed with iodine are then treated with boric acid. The treatment with boric acid is carried out by immersing the PVA fibers dyed with iodine in an aqueous solution of boric acid. The concentration of boric acid in the aqueous solution of boric acid is preferably about 2 to 15 wt %. The temperature of the aqueous solution of boric acid is, for example, 50 to 85° C. and the immersion time is, for example, about 30 to 1,000 sec. Iodine ions may be contained in the aqueous solution of boric acid by means of potassium iodide. A little colored polarizing plate, that is, a so-called "neutral gray" polarizing plate having almost fixed absorbance at almost the entire wavelength range of visible light can be obtained by using the aqueous solution of boric acid containing potassium iodide.

When the dichroic pigment is a dichroic dye, it is preferably a water-soluble dye such as an acid dye or direct dye, and azo-based dyes, stilbene-based dyes, anthraquinone-based dyes, methine-based dyes and cyanine-based dyes may be used. Specific examples of these dyes include disazo compounds disclosed by JP-A 59-145255 and JP-A 60-156759, trisazo compounds disclosed by JP-A 3-78703, and compounds represented by the following color index generic names, such as CI Direct Yellow 12, CI Direct Yellow 44, CI Direct Orange 26, CI Direct Orange 39, CI Direct Red 2, CI Direct Red 23, CI Direct Red 31, CI Direct Red 79, CI Direct Red 81, CI Direct Violet 9, CI Direct Violet 35, CI Direct Violet 51, CI Direct Blue 15, CI Direct Blue 78, CI Direct Blue 90, CI Direct Blue 168, CI Direct Blue 202, CI Direct Blue 203, CI Brown 2, CI Black 17, CI Direct Black 19, CI Direct Black 118 and CI Direct Black 132. These water-soluble dyes contain a pigment component which can provide polarization ability in an amount of preferably 95% or more, more preferably 99% or more (weight ratio). Impurities other than the target pigment component, such as inorganic salts and unreacted products are removed by an ion exchange membrane or re-crystallization. Before actual use, as a single dye has polarization characteristics at a specific wavelength range, it is preferred to use two or more different types of water-soluble dyes having absorption characteristics at different regions in the following wavelength range in suitable amounts in order to obtain a polarizing film having excellent polarization characteristics at the entire visible wavelength range of 400 to 700 nm which is most commonly used. A specific example of a combination of the water-soluble dyes is a combination of CI Direct Orange 39, CI Direct Red 81, green blue in Example 23 of JP-A 59-145255 and blue disclosed by JP-A 3-78703. As a method of dyeing with a dichroic dye, the PVA fibers are immersed in an aqueous solution containing 0.02 to 0.1 wt % of a dye at a temperature of 30 to 50° C. for 100 to 600 sec. The dyed PVA fibers are preferably immersed in an aqueous solution containing 2 to 15 wt % of boric acid like the above iodine. Thereby, a polarizing plate comprising fibers dyed with a dichroic dye can be obtained.

[Optically Transparent Resin (c)]

The polarizing plate of the present invention is basically composed of (a) PVA fibers containing a dichroic pigment, (b) fibers having a difference between the refractive index of fiber in long axis and the refractive index of fiber in short axis of 0.05 or more, and an optically transparent resin. For example, the PVA fibers (a) and the fibers (b) are in the form of a sheet encapsulated and fixed in the optically transparent resin. If the polarizing plate is composed of only the fibers (a) and the fibers (b), the arrangement of these fibers in one direction cannot be maintained, and polarization performance cannot be developed continuously. In addition, if the PVA fibers as the fibers (a) are directly exposed to the air, they are greatly influenced by temperature and humidity, whereby shrinkage by moisture absorption and the disturbance of the alignment of the dichroic pigment readily occur, thereby making it impossible to obtain high durability. The optically transparent resin plays an important role as a component which fixes and holds the fibers (a) and the fibers (b) and has the function of suppressing deterioration that affects the polarizing plate.

The optically transparent resin serves as a substrate for the polarizing plate. Therefore, it is preferred that the optically transparent resin should have little absorption or substantially no absorption at a visible range and show high adhesion to the fibers (a) and the fibers (b). The optically transparent resin functions as the substrate of the polarizing plate. Therefore, when the substrate itself has birefringence and the polarizing plate is arranged in a cross nicol state, the optically transparent resin may cause a defect such as light passage. Consequently, materials such as a thermoplastic resin having low capability of developing a phase difference, or a thermally or optically curable resin is preferred. The optically transparent resin in the present invention must be transparent at a visible range. More specifically, when the optically transparent resin is formed into a 50 μm-thick film, the light transmittance of the resin at a wavelength of 400 to 800 nm of this film must be 80% or more, preferably 85% or more, most preferably 90% or more.

Some examples of the material of the optically transparent resin are given below.

Examples of the thermoplastic resin include acrylic resins such as poly(methylmethacrylate), polyolefins such as polyethylene, polyesters such as polyethylene terephthalate, polyethers such as polyphenylene oxide, vinyl resins such as polyvinyl alcohol, polyurethanes, polyamides, polyimides, epoxy resins, copolymer of two or more monomers constituting them, and non-birefringence polymer blends such as a mixture of poly(methylmethacrylate) and polyvinyl chloride in a weight ratio of 82:18, a mixture of poly(methylmethacrylate) and polyphenylene oxide in a weight ratio of 65:35, and a mixture of a styrene-maleic anhydride copolymer and a polycarbonate in a weight ratio of 77:23.

The optically transparent resin may be a curable resin. It is preferred as a material having excellent workability because it cures quickly after it is applied to the fibers (a) and (b). A typical example of the curable resin is a crosslinkable resin which is obtained by curing through a crosslinking reaction with external excitation energy. It is an active ray curable resin which cures by the application of active rays such as ultraviolet radiation or electron beam or a thermally crosslinkable resin which starts a crosslinking reaction by heat.

A typical example of the active ray curable resin is a ultraviolet curable resin. Examples of the ultraviolet curable resin include ultraviolet curable polyester acrylate resins, ultraviolet curable acrylic urethane resins, ultraviolet curable methacrylate resin, ultraviolet curable polyester acrylate resins and ultraviolet curable polyol acrylate resins. Ultraviolet curable polyol acrylate resins are preferred, and optical polymerization monomer oligomers such as trimethylolpropane triacrylate, ditrimethylolpropane tetraacrylate, pentaerythritol triacrylate, pentaerythritol tetraacrylate, dipentaerythritol pentaacrylate, dipentaerythritol hexaacrylate and alkyl modified dipentaerythritol are more preferred.

Preferred examples of the electron beam curable resin include electron beam curable resins having an acrylate functional group, such as polyester resins, polyether resins, acrylic resins, epoxy resins, urethane resins, alkyd resins, spiroacetal resins, polybutadiene resins and polythiol polyene resins having a relatively low molecular weight.

Examples of the thermally curable resin include epoxy resins, phenoxy resins, phenoxy ether resins, phenoxy ester resins, acrylic resins, melamine resins, phenolic resins, urethane resins and mixtures thereof.

[Fibers (b') Having a Difference Between Refractive Index of Fiber in Long Axis and Refractive Index of Fiber in Short Axis of Less than 0.05]

The fibers are optionally used in the first polarizing plate of the present invention. The fibers do not adsorb a dichroic pigment. The polymer of the fibers is a polymer which can be processed into fibers and has a difference between the refractive index of fiber in long axis and the refractive index of fiber in short axis of less than 0.05, preferably less than 0.03, more preferably less than 0.01 when it is processed into fibers. Examples of the polymer include acrylic resin, nylon resin, polyolefins, polyesters, polystyrene, polyether, polycarbonate, vinyl resin, polyurethane, polyamide, polyimides and epoxy resins.

As for the thickness of the fibers, the average diameter is preferably 0.7 to 100 μm, more preferably 0.8 to 80 μm, much more preferably 1 to 50 μm. When the fibers are as thin as less than 0.7 μm, it is difficult to spin and stretch the fibers and the fibers are readily subjected to surface scattering at a wavelength of a visible range which greatly depends on the size of the fibers, thereby making it difficult to display a uniform color. When the fibers are as thick as more than 100 μm and arranged in one direction to form a polarizing plate having a desired thickness, a space is formed between them because the fibers are too thick, thereby causing light passage and making it difficult to realize a high degree of polarization.

The fibers do not need to be uniform in thickness and may be in any form such as monofilament or multifilament if they can form a fabric. The sectional form of each of the fibers is not limited to circular but may be elliptic, triangular, quadrangular, pentagonal, hexagonal or polygonal.

The sectional forms of the fibers used in one assembly of fibers do not need to be the same and the assembly may be composed of fibers having different shapes. When fibers have the same shape, it is not necessary to adjust the mixing ratio to obtain a homogeneous assembly. The aspect ratio of the fiber is 10 or more, preferably 20 or more, more preferably 100 or more. Preferably, the fibers are basically treated as a fabric. In this case, infinitely long fibers are preferred but the fibers must have a length of at least 1 m, preferably 10 m or more, more preferably 100 m or more.

[Relationship Among Fibers (a), Fibers (b), Optically Transparent Resin (c) Used in the First Polarizing Plate of the Present Invention and Optional Fibers (b')]

In the first polarizing plate of the present invention, the one direction where the above plurality of fibers (a) are arranged and the one direction where the above plurality of fibers (b) are arranged are the same or orthogonal to each other. When they are the same, the refractive index of fiber in short axis of the above plurality of fibers (b) and the refractive index of the optically transparent resin (c) become almost the same, and when they are orthogonal to each other, the refractive index of fiber in long axis of the above plurality of fibers (b) and the refractive index of the optically transparent fibers (c) become almost the same. The expression "almost the same" means that the difference between the refractive index of fiber in long axis of the fibers (b) and the refractive index of the optically transparent resin (c) is 0.01 or less. A polarizing plate having a high degree of polarization is obtained by using an optical transparent resin having almost the same refractive index as the refractive index of fiber in long axis of the fibers (b).

When the one direction where the above plurality of fibers (a) are arranged and the one direction where the above plurality of fibers (b) are arranged are orthogonal to each other, preferably, either one of the above plurality of fibers (a) and the above plurality of fibers (b) are used as warp and the other fibers are used as weft in a fabric. In this case, they are preferably woven at a high density. Examples of the technology for weaving fine fibers at a high density include technologies disclosed by JP-A 09-170175 and JP-A 2000-008247. The technology of weaving them into a fabric is not limited to these and existing technologies for a high-density fabric may be employed. As for the fabric, calendering is carried out with a hot press to eliminate a space between fibers, and secondary processing such as flattening may be carried out. The fibers used in the fabric may be monofilaments or multi-filaments out of which multi-filaments are preferred because it is easy to handle them. Although the width and length of the obtained fabric are not particularly limited, from the industrial point of view, preferably, the width is 300 to 4,000 mm and the length is 10 m or more, more preferably, the width is 400 to 3,500 mm and the length is 100 m or more, and most preferably, the width is 500 to 3,000 mm and the length is 200 m or more. When the width is less than 300 mm and the length is less than 10 m, the width of the fabric does not become equal to the width of the retardation film to be joined to the fabric and the processing yield becomes low. When the width is larger than 4,000 mm, it is difficult to roll the fabric uniformly as a roll film. As for the warp and weft of the fabric, when the PVA fibers (a) are used as warp, the fibers (b) are used as weft and when the fibers (b) are used as warp, the PVA fibers (a) are used as weft. It doesn't matter which fibers are used as warp or weft.

It is desired that the above plurality of fibers (a) and the above plurality of fibers (b) should be encapsulated and fixed in the optically transparent resin.

When the first polarizing plate of the present invention comprises the fibers (b') having a difference between the refractive index of fiber in long axis and the refractive index of fiber in short axis of less than 0.05, the average value of the refractive index of fiber in long axis and the refractive index of fiber in short axis of the fibers (b') becomes almost the same as the refractive index of the optically transparent resin (c).

When the fibers (b') are contained and the one direction where the above plurality of fibers (a) are arranged and the one direction where the above plurality of fibers (b) are arranged are the same, the one direction where the above plurality of fibers (b') are arranged is preferably orthogonal to the one direction where the plurality of fibers (a) are arranged and to the one direction where the plurality of fibers (b) are arranged.

Further, a fabric can be formed by using either one or both of the above plurality of fibers (a) and the above plurality of fibers (b) as warp or weft and the above plurality of fibers (b') as warp or weft.

It is desired that the above plurality of fibers (a), the above plurality of fibers (b) and the above plurality of fibers (b') should be encapsulated and fixed in the optically transparent resin.

A description is subsequently given of the second polarizing plate of the present invention.

The second polarizing plate is composed of the fibers (a), the fibers (b') and the optically transparent resin (c). The above fibers (a), the optically transparent resin (c) and the fibers (b') are identical to those described for the first polarizing plate.

When the second polarizing plate comprises the above fibers (a) and the fibers (b'), the average value of the refractive index of fiber in long axis and the refractive index of fiber in short axis of the above fibers (b') and the refractive index of the optically transparent resin (c) become almost the same. In this case, a fabric woven by using either one of the above plurality of fibers (a) and the above plurality of fibers (b') as warp and the other fibers as weft so that the one direction where the above plurality of fibers (a) are arranged and the one direction where the above plurality of fibers (b') are arranged become orthogonal to each other is preferred. It is desired that the above plurality of fibers (a) and the plurality of fibers (b') should be encapsulated and fixed in the optically transparent resin.

[3-D Structures of the First and Second Polarizing Plates of the Present Invention]

In the polarizing plate of the present invention, the fibers (a) to which a dichroic pigment is adsorbed and aligned are arranged in one direction within the plane of the polarizing plate. At this point, the polarizing plate can have a wavy structure in the thickness direction. When the 3-D structure of the polarizing plate of the present invention is expressed by using XYZ coordinates, that the fibers (a) are arranged in one direction within the plane of the polarizing plate means that one or more fibers (a) are arranged in a direction parallel to the X direction when the plane of the polarizing plate is an XY plane and the X direction is specified as the one direction. That the fibers (a) have a wavy structure in the thickness direction of the polarizing plate means that they have a shape with an amplitude in the Z direction with respect to the XY plane and further that the wavy structure has an amplitude that starts from "0", changes from positive to negative values and ends at "0" as one cycle in the Z direction. The wavy structure is preferably regular and uniform. That a portion of the fiber (a) has stereoregularity with an amplitude in the Z direction with respect to the XY plane which is the plane of the polarizing plate means that the fiber (a) has an angle with respect to the XY plane. When the maximum angle R from the XY plane at a ¼ of the cycle of the wavy structure is defined as an index indicating the size of the above angle, it is possible for a liquid crystal display device to compensate for polarization characteristics at the maximum angle R. Therefore, as the maximum angle R increases, the wavy form of the fiber (a) becomes more preferred. Specifically, the maximum angle R is preferably 5° or more, more preferably 10° or more, most preferably 15° or more.

The wavy form made by the fibers (a) in the present invention is, for example, a fabric of the fibers. When the wavy form is made by using the fabric, the pitch of the amplitude of the wavy form and the maximum angle R from the XY plane can be adjusted by the ratio of the fiber diameters of the warp to the weft. For example, when the fibers (a) are used as warp and another optically transparent yarn is used as weft, the pitch of the amplitude of the wavy form and the maximum angle R from the XY plane can be increased by making the fiber diameter of the weft larger than that of the warp, and the pitch of the amplitude of the wavy form and the maximum angle R from the XY plane can be reduced by making the fiber diameter of the weft smaller than that of the warp. The technology for forming the wavy form of the fibers (a) is not limited to a fabric processing technology but a technology for arranging shape-memory fibers or a method of forming a wavy form, such as providing a wavy form by a hot press, may be employed.

[Polarizing Plate Roll of the Present Invention]

The polarizing plate roll of the present invention is a roll of the above first or second polarizing plate of the present invention, and the directions of the transmission axis and the absorption axis of the above polarizing plate are not the same as the winding direction of the above roll and a direction orthogonal to the winding direction.

When a polarizing plate roll is formed by using a fabric comprising the fibers (a) as weft, the transmission axis of the polarizing plate becomes the short-axis direction (sectional direction) of the fibers (a), whereby the transmission axis of the polarizing plate can be adjusted to a direction parallel to the winding direction of the polarizing plate roll.

The above fabric is, for example, a multi-axial woven fabric which is woven in two or more axial directions. The method of manufacturing a biaxial woven fabric is, for example, a method for processing fibers (a) into a sheet by inclining them at a specific angle with respect to the lengthwise direction of the fabric with a "diagonally weaving" loom for crossing the warp and the weft diagonally. The technology for weaving a biaxial woven fabric diagonally is disclosed by JP-B 51-28748 and JP-A 63-196738. The diagonally biaxial woven fabric in the present invention can be manufactured by using the above fibers (b) or (b') as warp and the fibers (a) as weft. The angle of the transmission axis of the polarizing plate comprising the obtained diagonally woven sheet can be controlled by adjusting the crossing direction of the fibers (a) as weft. The transmission axis of the polarizing plate is in the short-axis direction of the fibers.

Other fabrics used in the present invention are multi-axial woven fabrics such as triaxial woven fabrics and tetraaxial woven fabrics. The fibers (a) can be processed into a sheet by inclining the fibers (a) at a specific angle with respect to the lengthwise direction of the fabric. Since the fibers (a) become fibers arranged in one direction at this point, the transmission axis is in one direction perpendicular to the lengthwise direction of the fibers (a). To manufacture a multi-axial woven fabric which is woven in two or more axial directions, while yarn is arranged in one direction, another yarn is arranged in the same manner in a different direction and placed on the above yarn in a different direction from the above one direction, and an adhesive solution or powder is applied to these yarns, they are stitched with a thread to be combined together, or the above solution or powder is sprayed on the yarn arranged in one direction to provide heat adhesion so as to fix it to yarn arranged in multiple directions. In these methods, equipment for aligning the yarn in one direction or multiple directions and equipment for fixing the yarn to keep the aligned yarn at the time of adhesion are used. This manufacturing method is disclosed by JP-B 62-54904 and JP-B 47-6585. Further, the crossing angle between the warp and the weft can be easily controlled by letting the fabric passing through an angle control device. The fabric which has been subjected to the control of the above angle may be used as a single fabric or treated as a high-order multi-axial woven fabric by joining together fabrics which have been subjected to the control of the above angle and melt fusing them together.

The fabric may be a plain woven fabric, twill fabric, satin woven fabric, horizontal-striped fabric or leno woven fabric.

The thickness of the polarizing plate of the present invention is generally 1 to 200 µm, preferably 5 to 150 µm, most preferably 10 to 100 µm. When the thickness of the polarizing plate is smaller than 1 µm, it is difficult to ensure a polarizing function as the polarizing plate and also to handle the polarizing plate. When the thickness is larger than 200 µm, the obtained polarizing plate has problems that cracking may occur by bending, it cannot be handled in a rolled state, and it is extremely difficult to cut it.

To manufacture the polarizing plate roll of the present invention, the aligning direction of the fibers (a) is not limited to the transfer direction of the polarizing plate, that is, the longitudinal direction of the polarizing plate roll and may be orthogonal to the transfer direction, or the fibers may be aligned and fixed at a predetermined angle as required. When the polarizing plate is treated as a film, the film is rolled and treated as a roll, and the length and width of the film roll are not limited. The polarizing plate is wound around a cylindrical core made of laminated paper or vinyl chloride to obtain a polarized plate roll.

To manufacture the polarized plate roll of the present invention, as an example in which a curable resin is used as the optically transparent resin, the above curable resin is applied to a fabric comprising the fibers (a) by optionally using a solvent, cured and dried to form a film which is rolled. A curable resin which can form a cured resin layer right after it is applied is preferred when productivity is taken into consideration, and an ultraviolet curable resin is more preferred when a commonly used material and processing equipment are taken into consideration.

The fabric comprising the above fibers (a) may be placed on a base substrate such as a polymer film or glass substrate, and a curable resin may be applied to the fabric and cured. Although the polarizing plate of the present invention may be combined with the polymer film or glass substrate in this case, the polymer film or glass substrate may be taken off from the fabric.

A retardation film may be used as the base substrate of a support for the fabric comprising the fibers (a), and the polarizing plate of the present invention does not need to be taken off from the retardation film and can be combined with the retardation film.

The polarizing plate roll of the present invention has a structure that the polarizing plate is wound around the above material in a columnar roll form.

The size of the roll is not particularly limited but preferably has a diameter of 1 to 20 inches. The length of the polarizing plate roll is not particularly limited but 100 to 10,000 m, for example.

The polarizing plate roll of the present invention may be subjected to a surface treatment. As the surface treatment, the surface not joined to the liquid crystal cell may be subjected to a hard coat treatment, anti-reflection treatment, sticking preventing treatment, diffusion treatment or anti-glare treatment.

The hard coat treatment is carried out to prevent the polarizing film from being scratched. For example, a cured film having excellent hardness and slipperiness made of a suitable ultraviolet curable resin such as an acrylic or silicone-based ultraviolet curable resin can be formed on the surface of a transparent protective film. A polarizing plate having a hard coat function may be obtained by using a suitable ultraviolet curable resin itself such as an acrylic or silicone-based ultraviolet curable resin. The anti-reflection treatment is carried out to prevent the reflection of extraneous light on the surface of the polarizing plate and can be attained by the formation of an anti-reflection film according to prior arts. The sticking preventing treatment is carried out to prevent adhesion between adjacent layers.

The anti-glare treatment is carried out to prevent light passing through the polarizing plate from being invisible by the reflection of extraneous light on the surface of the polarizing plate. For example, a fine irregular structure can be formed on the surface of a transparent protective film by a suitable method such as the blending of transparent fine particles, or sandblasting or embossing to make the surface rough. Examples of the fine particles contained to form the above surface fine irregular structure include transparent fine particles such as conductive inorganic fine particles including silica, alumina, titania, zirconia, tin oxide, indium oxide, cadmium oxide and antimony oxide particles having an average particle diameter of 0.5 to 50 µm and organic fine particles of crosslinked or uncrosslinked polymers. To form the surface fine irregular structure, the amount of the fine particles is generally 2 to 50 parts by weight, preferably 5 to 25 parts by weight based on 100 parts by weight of the transparent resin forming the surface fine irregular structure. The anti-glare layer may serve as a diffusion layer for expanding the view angle by diffusing polarization transmitted light (function of expanding the view angle).

The polarizing plate roll of the present invention is preferably subjected to a surface treatment before it is bonded to the liquid crystal cell. The surface treatment is a corona discharge treatment or ultraviolet application treatment, and the surface is made in a state that the contact angle of a waterdrop on the surface of the film is preferably 65° or less, more preferably 60° or less.

The polarizing plate roll of the present invention may be used in combination with an optical correction film such as a retardation film or a view angle expanding film. Further, the polarizing plate of the present invention may be used in a liquid crystal display device comprising ferroelectric liquid crystals or antiferroelectric liquid crystals. When the polarizing plate roll is used in combination with the retardation film, it is advantageous in the production process to join the polarizing plate roll of the present invention to a roll of the retardation film. At this point, the transmission axis of the polarizing plate roll is in one direction other than a direction orthogonal to the winding direction of the roll. It is preferred from the efficiency of a cut size after the lamination of the retardation film that the transmission axis should be in a direction parallel to the winding direction of the polarizing film. Further, the transmission axis is existent in one direction at preferably 5 to 85°, more preferably 10 to 80°, most preferably 20 to 70° when the winding direction of the polarizing film is 0° as a combination having characteristic properties at the time of joining the retardation film.

[Optical Component]

The first and second polarizing plates of the present invention are useful as a polarizing layer to form an optical component composed of a laminate consisting of the polarizing plate and an optical layer showing an optical function other than polarization. When the polarizing plate of the present invention is the first polarizing plate and the plane where the plurality of fibers (a) are arranged and the plane where the plurality of fibers (b) are arranged are overlapped with each other in the thickness direction of the polarizing plate, the above optical layer is formed on the plane where the plurality of fibers (a) are arranged. The optical layer showing an optical function other than polarization is, for example, a phase difference layer.

The phase difference layer in the present invention is a layer which provides a phase difference, and a retardation film obtained by stretching a transparent thermoplastic synthetic polymer film is such an example.

The retardation film is preferably excellent in transparency, mechanical strength, thermal stability, moisture shielding properties and isotropy. The materials which provide the retardation film include polyesters such as polyethylene terephthalate and polyethylene naphthalate, acrylic polymers such as polymethyl methacrylate, styrene polymers such as polystyrene and acrylonitrile-styrene copolymer (AS resin), and polycarbonates. Polyolefins such as polyethylene, polypropylene, polyolefin having a cyclo-based structure or norbornene structure and ethylene-propylene copolymer, amide polymers such as vinyl chloride polymer, nylon and aromatic polyamides, imide polymers, sulfone polymers, polyether sulfone polymers, polyether ether ketone polymers, polyphenylene sulfide polymers, vinyl alcohol polymers, vinylidene chloride polymers, vinyl butyral polymers, arylate polymers, polyoxymethylene polymers and blends of the above polymers are also examples of the polymer forming the above retardation film. The retardation film must be thin and have sufficiently high strength. Preferred examples of the material suitable in this respect include polycarbonates, norbornene resin polymers, arylate polymers and polysulfones.

Preferably, the retardation film has high transparency, a haze value of 5% or less and a total light transmittance of 85% or more. The glass transition temperature of the retardation film is preferably 160 to 260° C., more preferably 170 to 250° C., particularly preferably 180 to 240° C. When the glass transition temperature falls below the above range, the dimensional stability deteriorates and when the glass transition temperature exceeds the above range, it is very difficult to control the temperature of the stretching step with the result of difficult production. The retardation film is a birefringence film having a phase difference, and the birefringence which is its optical property is represented by retardation values, particularly an in-plane retardation (R value) and a retardation (K value) in the thickness direction. The R value and the K value are defined by the following equations (a) and (b), respectively.

$$R = \Delta n \cdot d = (nx - ny) \cdot d \tag{a}$$

$$K = ((nx + ny)/2 - nz) \cdot d \tag{b}$$

The units of the R value and the K value are nm. nx, ny and nz are defined as follows.

nx: maximum refractive index within the plane of the film
ny: refractive index in a direction orthogonal to the direction of the maximum refractive index within the plane of the film
nz: refractive index in the normal direction of the film
d: thickness of the film The main stretching direction means the stretching direction in the case of monoaxial stretching and the stretching direction for increasing the degree of orientation in the case of biaxial stretching and refers to the aligning direction of the polymer main chain from the viewpoint of the chemical structure.

The retardation film may be an optically monoaxial or biaxial film having a phase difference.

Other phase difference layers are layers having refractive index anisotropy and an optical axis in the normal direction of the layer surface, such as a twist-aligned polymerizable chiral nematic (cholesteric) liquid crystal layer whose retardation has positive wavelength dispersion characteristics and whose reflection wavelength is in the ultraviolet range, a polymerizable discotic liquid crystal layer which is aligned homeotropically, a coating layer made of a material which provides a phase difference in the normal direction of the layer when coating, and a phase difference layer having a hybrid structure that refractive index ellipsoidal bodies are arranged radially in the thickness direction of the film. The retardation film may be either one of them.

[Polarizing Plate Application Fields]

The first and second polarizing plates of the present invention are used as a polarizing plate having an optical correction function when it is joined to a retardation film and can provide a liquid crystal display device having a wide view angle and excellent display quality such as contrast. They can be used in TFT liquid crystal display devices having a twist nematic mode, homeotropical alignment mode, OCB (Optically Compensated Bend) alignment mode or in-plane switching mode. They can be used in all the fields where they are used as a polarizing plate. For example, in the case of liquid crystal display devices, they can provide transmission type, reflection type and semi-transmission reflection type liquid crystal display devices using a back light, reflector or semi-transmission reflector as an illuminating system. Other display devices comprising a polarizing plate include liquid crystal projectors, display devices comprising ferroelectric liquid crystals or antiferroelectric liquid crystals and organic EL display devices. The polarizing plate of the present invention may be used in these display devices.

The polarizing plate of the present invention can be joined to a liquid crystal panel by using an adhesive layer. A separator is mounted on the polarizing plate having an adhesive layer formed thereon to cover it so as to prevent its contamination.

The adhesive layer may contain a resin such as a natural resin or synthetic resin, particularly a resin providing adhesion, and additives such as a filler comprising glass fibers, glass beads, metal powders or inorganic powders, pigment, colorant and antioxidant which are generally added to an adhesive layer. It may be an adhesive layer which contains fine particles to exhibit light diffusing properties. The formation of the adhesive layer on the polarizing plate may be carried out by a suitable method. For example, a solution containing 10 to 40 wt % of an adhesive is prepared by dissolving or dispersing a base polymer or its composition in a suitable solvent such as toluene or ethyl acetate or a mixture of solvents and applied to the polarizing plate or an optical film by a suitable method such as casting or coating to form an adhesive layer which is then fixed on the polarizing plate or the optical film. The thickness of the adhesive layer which can be suitably determined according to use purpose or adhesive force is generally 1 to 500 μm, preferably 2 to 200 μm, particularly preferably 10 to 100 μm.

The separator for the adhesive layer is, for example, a suitable thin material such as a plastic film, rubber sheet, paper, cloth, nonwoven fabric, net, foamed sheet, metal foil or laminated product thereof optionally coated with a suitable parting agent such as silicone-based, long-chain alkyl-based or fluorine-based parting agent, or molybdenum sulfide.

The optical component in the present invention is placed on one side or both sides of the liquid crystal cell. At this point, it is preferred that the fibers (a) constituting the optical component should be closer to the liquid crystal cell than the fibers (b) because a polarization function can be developed more.

EXAMPLES

The following examples are provided for the purpose of further illustrating the present invention but are in no way to be taken as limiting. The characteristic property values of the materials described in this description were obtained by the following evaluation methods.

(1) Measurement of Light Transmittance and Polarization Degree

The light transmittance T was calculated from a spectral transmittance t(λ) obtained at intervals of 10 nm in a wavelength range of 400 to 700 nm based on the following equation. In the equation, P(λ) is the spectral distribution of standard light (C light source), and y(λ) is a color-matching function based on the X-Y-Z coordinates system with a 2-degree field of vision. The spectral transmittance t(λ) was measured with a spectrophotometer (U-4000 of Hitachi, Ltd.).

$$T = \frac{\int_{400}^{700} P(\lambda) \cdot y(\lambda) \cdot t(\lambda) \cdot d\lambda}{\int_{400}^{700} P(\lambda) \cdot y(\lambda) \cdot d\lambda}$$

The polarization degree P was calculated from the following equation in which the transmittance is represented by Tp (para-Nicol transmittance) when two polarizing plates are assembled together in such a manner that the directions of their absorption axes become the same and the transmittance is represented by Tc (cross nicol transmittance) when the two polarizing plates are assembled together in such a manner that the directions of their absorption axes become orthogonal to each other.

$$P = \sqrt{\frac{Tp - Tc}{Tp + Tc}} \times 100$$

(2) Measurement of Thickness

This was measured with the electronic micrometer of Anritsu Corporation.

(3) Measurement of Refractive Index of Fibers

This was obtained from a phase difference value and a fiber diameter by an ordinary interference fringe method using the BH-2 polarization microscope compensator of Olympus Optical Co., Ltd.

Since the fibers are monoaxially oriented, the refractive index of fiber in long axis and refractive index of fiber in short axis of the fiber were calculated from fiber diameter, phase difference value and average refractive index.

Average refractive index: $n(\text{average})=(nx+ny+nz)/3$

Difference in refractive index: $\Delta n=nx-ny$

Monoaxial orientation: $ny=nz$ $nx=n(\text{average})+\Delta n \times 2/3$ $ny=nz=n(\text{average})-\Delta n \times 1/3$ (4) Evaluation of View Angle Characteristics of Polarizing plate The view angle was measured when two polarizing plates were assembled together in such a manner their absorption axes became orthogonal to each other (cross nicol arrangement) and the change A (TΔ 30%) of transmittance at 45° from the absorption axis became 30%.

Example 1

PVA (manufactured by Kuraray Co., Ltd., polymerization degree of 4,000, saponification degree of 99.9%) was dissolved in dimethyl sulfoxide (to be abbreviated as "DMSO" hereinafter) as a solvent to prepare a spinning stock solution having a PVA concentration of 16 wt %. This spinning stock solution was spun at 100° C. from a spinneret having 300 holes with a diameter of 100 μm into a coagulation bath of methanol at a spinning draft of 2.0 and an air gap of 30 mm by a dry-wet process, spun and drawn in the methanol bath while DMSO was extracted with methanol, and dried to obtain PVA unstretched yarn (diameter of 10 μm). This unstretched yarn was stretched to 6.5 times by using a heating roller at 110° C. to obtain PVA fibers (diameter of 2 μm). The PVA fibers were then fixed in the lengthwise direction and immersed in an aqueous solution containing iodine, potassium iodide and water in a weight ratio of 0.075/5/100 for 60 seconds. Further, the PVA fibers were immersed in a boric acid-containing aqueous solution containing potassium iodide, boric acid and water in a weight ratio of 6/7.5/100 at 65° C. for 300 seconds. The fibers were then rinsed with pure water and dried.

Thereafter, an esterification reaction was carried out by using 166 parts by weight of terephthalic acid and 75 parts by weight of ethylene glycol, and 0.03 part by weight of a 85 wt % aqueous solution of phosphoric acid as a coloring inhibitor, 0.06 part by weight of antimony trioxide as a polycondensation catalyst and 0.06 part by weight of cobalt acetate tetrahydrate as a toning agent were added to carry out a polycondensation reaction so as to obtain polyethylene terephthalate. Melt spinning was carried out at a spinning temperature of 295° C. by using this polyester so as to obtain polyester fibers (diameter of 5 μm). The refractive index of fiber in long axis of this polyester fibers was 1.63, the refractive index of fiber in short axis was 1.56, and the difference between these refractive indices was 0.07.

The PVA fibers absorbing iodine were arranged on a glass sheet without a space to a thickness of 20 μm (about 10 fiber layers) in the long-axis direction of glass and the polyester fibers were arranged on the PVA fibers in the same direction as that of the PVA fibers.

Then, 205 parts by weight of BPEF-A, 295 parts by weight of UA, 15 parts by weight of Irgacure 184 as an optical initiator and 0.18 part by weight of SH28PA as a leveling agent were added sequentially and stirred until a homogeneous solution was obtained.

BPEF-A: bisphenoxyethanolfluorene diacrylate (manufactured by Osaka Gas Co., Ltd.)
UA: urethane acrylate (NK Oligo U-15HA of Shin Nakamura Kagaku Co., Ltd.)
Irgacure 184 (manufactured by Ciba Geigy Co., Ltd.)
SH28PA (manufactured by Toray Dow Corning Co., Ltd.)

The prepared solution was uniformly applied to a laminate consisting of the layers of the PVA fibers (a) and the layers of the polyester fibers (b) prepared above to immerse the fiber layers (a) and (b) in the solution. The laminate was exposed to ultraviolet radiation having an integrated light quantity of 700 mJ/cm$^2$ from a high-pressure mercury lamp having an intensity of 160 W to cure the solution so as to obtain a polarizing plate having a thickness of 50 μm and the layers of the PVA fibers (a) and the layers of the polyester fibers (b) immersed in the optically transparent resin. The refractive index of the optically transparent resin was 1.56.

The polarizing plate obtained as the above had a light transmittance of 45.0% and a polarization degree of 99.9%. After this polarizing plate was humidified in a 85° C. and 85% RH atmosphere for 100 hours, its optical properties were measured. At this point, the polarizing plate had a transmittance of 44.9% and a polarization degree of 99.9%. Therefore, it was confirmed that the plating plate had high resistance to heat and humidity.

When a liquid crystal display device having the following constitution was manufactured by using the polarizing plate obtained the above and a commercially available transmission type liquid crystal display device (Play Station Portable PSP-1000 of Sony Corporation), the polarizing plate was arranged in a cross nicol state, and an increase in brightness while it was normally white was measured, the effect of increasing the brightness by 17% was confirmed.

Constitution: (fiber layer (b') side) polarizing plate (fiber layer (a) side)/retardation film/liquid crystal cell/retardation film/(fiber layer (a) side) polarizing plate (fiber layer (b') side)/two lens films/diffusion film/light guide plate+6 LED's (backlight)/specular reflector Reference Example 1

A PVA film (manufactured by Kuraray Co., Ltd., polymerization degree of 2,400, saponification degree of 99.9%, thickness of 75 μm) was monoxially stretched to 5.0 times at 110° C. to obtain a polarization substrate. This polarization substrate was immersed in an aqueous solution containing iodine, potassium iodide and water in a weight ratio of 0.075/5/100 for 60 seconds while tension at the time of stretching was maintained. Then it was immersed in a boric acid-containing aqueous solution containing potassium iodide, boric acid and water in a weight ratio of 6/7.5/100 at 65° C. for 300 seconds. This was rinsed with pure water and dried. The thickness of the obtained PVA film impregnated with iodine was 20 μm. A TAC film (Fuji TAC-UV80 of Fuji Photo Film Co., Ltd.) was joined to both sides of the dried film by a PVA-based adhesive. The polarizing plate obtained as the above had a transmittance of 44.1% and a polarization degree of 99.9%. This polarizing plate was humidified in a 85° C. ad 85% RH atmosphere for 100 hours to measure its optical properties. At this point, the polarizing plate had a transmittance of 58.3% and a polarization degree of 52.1%. The corrosion of the TAC film joined to protect the PVA film as a polarizer was observed.

When a liquid crystal display device having the following constitution was manufactured by using the polarizing plate obtained the above and a commercially available transmission type liquid crystal display device (Play Station Portable PSP-1000 of Sony Corporation), the polarizing plate was arranged in a cross nicol state, and an increase in brightness while it was normally white was measured, the brightness was the same as the initial value. Constitution/(PVA film side) polarizing plate (TAC film side)/retardation film/liquid crystal cell/retardation film/(PVA film side) polarizing plate (TAC film side)/two lens films/diffusion film/light guide plate+6 LED's (backlights)/specular reflector Example 2

PVA (manufactured by Kuraray Co., Ltd., polymerization degree of 4,000, saponification degree of 99.9%) was dissolved in dimethyl sulfoxide (to be abbreviated as "DMSO" hereinafter) as a solvent to prepare a spinning stock solution having a PVA concentration of 16 wt %. This spinning stock solution was spun at 100° C. from a spinneret having 50 holes with a diameter of 100 μm into a coagulation bath of methanol at a spinning draft of 2.0 and an air gap of 30 mm by a dry-wet process, spun and drawn in the methanol bath while DMSO was extracted with methanol, and dried to obtain PVA unstretched yarn (diameter of 6 μm). This unstretched yarn was stretched to 6.5 times by using a heating roller at 110° C. to obtain PVA fibers (diameter of 2 μm). The PVA fibers were then fixed in the lengthwise direction to prevent shrinkage in length and immersed in an aqueous solution containing iodine, potassium iodide and water in a weight ratio of 0.075/5/100 for 60 seconds. Further, the PVA fibers were immersed in a boric acid-containing aqueous solution containing potassium iodide, boric acid and water in a weight ratio of 6/7.5/100 at 65° C. for 300 seconds. The fibers were then rinsed with pure water and dried. A bundle of 50 of the dried PVA resin fibers adsorbing iodine was treated as a multifilament. The diameter of the multifilament was about 40 μm.

Thereafter, a polyethylene-2,6-naphthalate chip having an intrinsic viscosity of 0.85 was melt spun from a spinneret having 30 circular holes (L/D=2) with a diameter of 0.1 mm at a polymer temperature of 315° C. and a spinning rate of 500 m/min. At this point, three heating cylinders having a length of 30 cm were interconnected and installed right below the spinneret. 20° C. cooling air was blown over a length of 45 cm at a rate of 3.5 m$^3$/hr (normal) right below the heating cylinders to cool the yarn. Thereafter, an oil solution was applied to the yarn with an oiling roller, and the yarn was guided to a take-up roll and taken up by a winder. Thereby, polyethylene-2,6-naphthalate unstretched yarn having a diameter of 6 μm was obtained. At this point, the diameter of the multifilament was about 40 μm. The refractive index of fiber in long axis of the polyester fibers was 1.582, the refractive index of fiber in short axis was 1.577, the difference between these refractive indices was 0.005, and the average refractive index was 1.58.

As raw materials forming the optically transparent resin, 304.5 parts by weight of BPEF-A, 195.5 parts by weight of UA, 15 parts by weight of Irgacure 184 as an optical initiator and 0.18 part by weight of SH28PA as a leveling agent were added sequentially and stirred until a homogeneous solution was obtained to prepare a solution.

BPEF-A: bisphenoxyethanolfluorene diacrylate (manufactured by Osaka Gas Co., Ltd.)
US: urethane acrylate (NK Oligo U-15HA of Shin Nakamura Kagaku Co., Ltd.)
Irgacure 184 (manufactured by Ciba Geigy Co., Ltd.)
SH28PA (manufactured by Toray Dow Corning Co., Ltd.)

A fabric having a length of 40 cm, a width of 20 cm and a thickness of 40 μm was manufactured by using the PVA fibers (a) adsorbing iodine as warp and the polyester fibers (b') as weft. The above prepared solution was applied to the both sides of this fabric by immersing the fabric composed of the fibers (a) and (b') in the solution. The solution was cured by the application of ultraviolet radiation from a high-pressure mercury lamp to obtain a polarizing plate having a thickness of 50 μm and comprising the fibers (a) and (b') immersed and fixed in the optically transparent resin. The polarizing plate obtained as the above had a transmittance of 45.2% and a polarization degree of 99.9%. After this polarizing plate was humidified in a 85° C. and 85% RH atmosphere for 100 hours, its optical properties were measured. At this point, the polarizing plate had a transmittance of 44.6% and a polarization degree of 99.9%. The refractive index of the optically transparent resin was 1.58.

Example 3

PVA (manufactured by Kuraray Co., Ltd., polymerization degree of 4,000, saponification degree of 99.9%) was dissolved in dimethyl sulfoxide (to be abbreviated as "DMSO" hereinafter) as a solvent to prepare a spinning stock solution having a PVA concentration of 16 wt %. This spinning stock solution was spun at 100° C. from a spinneret having 50 holes with a diameter of 100 μm into a coagulation bath of methanol at a spinning draft of 2.0 and an air gap of 30 mm by a dry-wet process, spun and drawn in the methanol bath while DMSO was extracted with methanol, and dried to obtain PVA unstretched yarn (diameter of 10 μm). This unstretched yarn was stretched to 6.5 times by using a heating roller at 110° C. to obtain PVA fibers (diameter of 2 μm). The PVA fibers were then fixed in the lengthwise direction and immersed in an aqueous solution containing iodine, potassium iodide and water in a weight ratio of 0.075/5/100 for 60 seconds. Further, the PVA fibers were immersed in a boric acid-containing aqueous solution containing potassium iodide, boric acid and water in a weight ratio of 6/7.5/100 at 65° C. for 300 seconds. The fibers were then rinsed with pure water and dried. A bundle of 50 of the dried PVA resin fibers adsorbing iodine was treated as a multifilament. The diameter of the multifilament was about 40 μm.

Thereafter, an esterification reaction was carried out by using 166 parts by weight of terephthalic acid and 75 parts by weight of ethylene glycol, and 0.03 part by weight of a 85% aqueous solution of phosphoric acid as a coloring inhibitor, 0.06 part by weight of antimony trioxide as a polycondensation catalyst and 0.06 part by weight of cobalt acetate tetrahydrate as a toning agent were added to carry out a polycondensation reaction so as to obtain polyethylene terephthalate. Melt spinning was carried out at a spinning temperature of 295° C. by using this polyester so as to obtain polyester fibers (diameter of 3 μm). The refractive index of fiber in long axis of the polyester fibers was 1.62 and the refractive index of fiber in short axis was 1.55 and the difference between these refractive indices was 0.07. A bundle of 40 of the polyester fibers was treated as a multifilament. The diameter of the multifilament was 40 μm.

As for the optically transparent resin, 460 parts by weight of BPEF-A, 40 parts by weight of UA, 15 parts by weight of Irgacure 184 as an optical initiator and 0.18 part by weight of SH28PA as a leveling agent were added sequentially and stirred until a homogeneous solution was obtained to prepare a solution.

BPEF-A: bisphenoxyethanolfluorene diacrylate (manufactured by Osaka Gas Co., Ltd.)
US: urethane acrylate (NK Oligo U-15HA of Shin Nakamura Kagaku Co., Ltd.)
Irgacure 184 (manufactured by Ciba Geigy Co., Ltd.)
SH28PA (manufactured by Toray Dow Corning Co., Ltd.)

The PVA fibers (a) impregnated with iodine were arranged on a glass sheet without a space in the long-axis direction of glass and the polyester fibers (b) were arranged on the PVA fibers (a) in a direction orthogonal to that of the PVA fibers (a).

The optically transparent resin prepared above was uniformly applied to a laminate consisting of the layers of the fibers (a) and the layers of the fibers (b) to immersed these layers (a) and (b) in its solution. The optically transparent resin was cured by the application of ultraviolet radiation from a high-pressure mercury lamp to obtain a polarizing plate having a thickness of 85 μm and comprising the fiber layers (a) and (b) immersed and fixed in the optically transparent resin. The polarizing plate obtained as the above had a transmittance of 44.8% and a polarization degree of 99.9%. After this polarizing plate was humidified in a 85° C. and 85% RH atmosphere for 100 hours, its optical properties were measured. At this point, the polarizing plate had a transmittance of 44.6% and a polarization degree of 99.9%. The refractive index of the obtained optically transparent resin was 1.62.

When a liquid crystal display device having the following constitution was manufactured by using the polarizing plate obtained the above and a commercially available transmission type liquid crystal display device (Play Station Portable PSP-1000 of Sony Corporation), the polarizing plate was arranged in a cross nicol state and an increase in brightness while it was normally white was measured, the effect of increasing the brightness by 23% was confirmed.

Constitution: (fiber (b) side) polarizing plate (fiber (a) side)/ retardation film/liquid crystal cell/retardation film/(fiber (a) side) polarizing plate (fiber (b) side)/two lens films/ diffusion film/light guide plate+6 LED's (backlights)/ specular reflector Example 4

PVA fibers (a), fibers (b) and an optically transparent resin were obtained in the same manner as in Example 3.

Thereafter, a fabric having a length of 40 cm, a width of 20 cm and a thickness of 45 μm was manufactured by using the PVA fibers (a) as warp and the fibers (b) as weft. This fabric composed of the fibers (a) and (b) was immersed in the above prepared solution. The solution was cured by the application of ultraviolet radiation from a high-pressure mercury lamp so as to obtain a polarizing plate having a thickness of 50 μm and comprising the fibers (a) and (b) immersed and fixed in the optically transparent resin. The polarizing plate obtained as the above had a transmittance of 44.9% and a polarization degree of 99.9%. After this polarizing plate was humidified in a 85° C. and 85% RH atmosphere for 100 hours, its optical properties were measured. At this point, the polarizing plate had a transmittance of 44.8% and a polarization degree of 99.9%.

When a liquid crystal display device having the following constitution was manufactured by using the polarizing plate obtained the above and a commercially available transmission type liquid crystal display device (Play Station Portable PSP-1000 of Sony Corporation), the polarizing plate was arranged in a cross nicol state and an increase in brightness while it was normally white was measured, the effect of increasing the brightness by 16% was confirmed.

Constitution: (fiber (b) side) polarizing plate (fiber (a) side)/retardation film/liquid crystal cell/retardation film/(fiber (a) side) polarizing plate (fiber (b) side)/two lens films/diffusion film/light guide plate+6 LED's (backlights)/specular reflector

Example 5

PVA (manufactured by Kuraray Co., Ltd., polymerization degree of 4,000, saponification degree of 99.9%) was dissolved in dimethyl sulfoxide (to be abbreviated as "DMSO" hereinafter) as a solvent to prepare a spinning stock solution having a PVA concentration of 16 wt %. This spinning stock solution was spun at 100° C. from a spinneret having 50 holes with a diameter of 100 μm into a coagulation bath of methanol at a spinning draft of 2.0 and an air gap of 30 mm by a dry-wet process, spun in the methanol bath while DMSO was extracted with methanol, and dried to obtain PVA unstretched yarn (diameter of 86 μm, single yarn diameter of 10 μm). This unstretched yarn was stretched to 6.5 times by using a heating roller at 110° C. to obtain PVA stretched yarn (diameter of 15 μm, single yarn diameter of 2 μm). This PVA stretched yarn was then fixed in the lengthwise direction and immersed in an aqueous solution containing iodine, potassium iodide and water in a weight ratio of 0.075/5/100 for 60 seconds. Further, the PVA stretched yarn was immersed in a boric acid-containing aqueous solution containing potassium iodide, boric acid and water in a weight ratio of 6/7.5/100 at 65° C. for 300 seconds. It was then rinsed with pure water and dried. The diameter of the dried PVA stretched yarn adsorbing iodine was about 20 μm.

Thereafter, a polyethylene-2,6-naphthalate (to be referred to as "polyester" hereinafter) chip having an intrinsic viscosity of 0.85 was melt spun from a spinneret having 30 circular holes (L/D=2) with a diameter of 0.1 mm at a polymer temperature of 315° C. and a spinning rate of 500 m/min. At this point, three heating cylinders having a length of 30 cm were interconnected and installed right below the spinneret. 20° C. cooling air was blown over a length of 45 cm at a rate of 3.5 m$^3$/hr (normal) right below the heating cylinders to cool the yarn. Thereafter, an oil solution was applied to the yarn with an oiling roller and the yarn was guided to a take-up roll and taken up by a winder. Thereby, polyester unstretched yarn having a diameter of about 40 μm was obtained. At this point, the diameter of single yarn was about 6 μm. The refractive index of the fiber in long axis of the unstretched yarn was 1.582, the refractive index of fiber in short axis was 1.577, the difference between these refractive indices was 0.005, and the average refractive index was 1.58.

As raw materials forming the optically transparent resin, 304.5 parts by weight of BPEF-A, 195.5 parts by weight of UA, 15 parts by weight of Irgacure 184 as an optical initiator and 0.18 part by weight of SH28PA as a leveling agent were added sequentially and stirred until a homogeneous solution was obtained to prepare a solution.

BPEF-A: bisphenoxyethanolfluorene diacrylate (manufactured by Osaka Gas Co., Ltd.)
US: urethane acrylate (NK Oligo U-15HA of Shin Nakamura Kagaku Co., Ltd.)
Irgacure 184 (manufactured by Ciba Geigy Co., Ltd.)
SH28PA (manufactured by Toray Dow Corning Co., Ltd.)

A multi-axial woven fabric was manufactured by using the PVA stretched yarn adsorbing iodine and the polyester unstretched yarn. That is, a triaxial woven fabric having a length of 100 m, a width of 800 mm and a thickness of 70 μm was manufactured by arranging the transfer direction of the fabric at 0°, the above PVA stretched yarn at 135° from the above transfer direction in the clockwise direction and the polyester unstretched yarn at 0° and 45°.

The optically transparent resin prepared above was uniformly applied to this triaxial woven fabric to immerse the fabric in its solution. This solution was cured by application of ultraviolet radiation from a high-pressure mercury lamp to obtain a polarizing film having a thickness of 90 μm and comprising the fabric immersed and fixed in the optically transparent resin. This polarizing film was taken up to a 3-inch vinyl chloride core to obtain a polarizing film roll. The transmission axis of the polarizing obtained film as the above was at 45° in the clockwise direction when the winding direction of the roll was 0°, and the polarizing film had a transmittance of 44.8% and a polarization degree of 99.9%. After this polarizing film was humidified in a 85° C. and 85% RH atmosphere for 100 hours, its optical properties were measured. At this point, the transmission axis of the polarizing film had a transmittance of 44.6% and a polarization degree of 99.9%. The refractive index of the obtained optically transparent resin was 1.58.

A circularly polarizing film roll was manufactured by joining together this polarizing film roll and a roll of the Pure Ace WR (W142) retardation film having a length of 110 m, a width of 820 mm and a thickness of 100 μm manufactured by Teijin Chemicals Limited by an adhesive. This circularly polarizing film roll was processed into a circular polarizing film chip having a required size in a direction parallel to the transmission axis.

A liquid crystal display device having the following constitution was manufactured by using this circular polarizing film and a commercially available reflection type liquid crystal display device (Game Boy AGB-001 of Nintendo Co., Ltd.) and the polarizing film was arranged in a cross nicol state to display an image.

Constitution: (display screen) polarizing film/retardation film/liquid crystal cell/retardation film/polarizing film (rear side)

When this reflection type liquid crystal display device was driven, it was confirmed that an image of the same quality as the initial image was displayed.

Example 6

PVA (manufactured by Kuraray Co., Ltd., polymerization degree of 4,000, saponification degree of 99.9%) was dissolved in dimethyl sulfoxide (to be abbreviated as "DMSO" hereinafter) as a solvent to prepare a spinning stock solution having a PVA concentration of 16 wt %. This spinning stock solution was spun at 100° C. from a spinneret having 7 holes with a diameter of 200 μm into a coagulation bath of methanol at a spinning draft of 2.0 and an air gap of 30 mm by a dry-wet process, spun and drawn in the methanol bath while DMSO was extracted with methanol, and dried to obtain PVA unstretched yarn (diameter of 26 μm). This unstretched yarn was stretched to 6.5 times by using a heating roller at 110° C. to obtain PVA fibers (diameter of 8 μm). The PVA fibers were then fixed in the lengthwise direction to prevent shrinkage in length and immersed in an aqueous solution containing iodine, potassium iodide and water in a weight ratio of 0.075/5/100 for 60 seconds. Further, the PVA fibers were immersed in a boric acid-containing aqueous solution containing potassium iodide, boric acid and water in a weight ratio of 6/7.5/100 at 65° C. for 300 seconds. The fibers were then rinsed with water and dried. A bundle of 7 of the dried PVA resins fiber adsorbing iodine were treated as a multifilament. The diameter of the multifilament was about 20 μm.

Thereafter, a polyester (polyethylene-2,6-naphthalate) chip having an intrinsic viscosity of 0.85 was melt spun from a spinneret having 7 circular holes (L/D=2) with a diameter of 0.1 mm at a polymer temperature of 315° C. and a spinning rate of 500 m/min. At this point, three heating cylinders having a length of 30 cm were interconnected and installed right below the spinneret. 20° C. cooling air was blown over a length of 45 cm at a rate of 3.5 m$^3$/hr (normal) right below the heating cylinders to cool the yarn. Thereafter, an oil solution was applied to the yarn with an oiling roller and the yarn was guided to a take-up roll and taken up by a winder. Thereby, polyethylene-2,6-naphthalate unstretched yarn having a diameter of about 8 μm was obtained. At this point, the diameter of the multifilament was about 20 μm. The average refractive index of the polyester fibers was 1.580 and the difference Δn between refractive indices was 0.003. Thereby, the polyester fibers had a refractive index of fiber in long axis of 1.582 and a refractive index of fiber in short axis of 1.579. When this polyester was processed into a film having a thickness of 100 μm, its total light transmittance was 91%.

An optical transparent resin was then prepared. As raw materials forming the optically transparent resin, 304.5 parts by weight of BPEF-A, 195.5 parts by weight of UA, 15 parts by weight of Irgacure 184 as an optical initiator and 0.18 part by weight of SH28PA as a leveling agent were added sequentially and stirred until a homogeneous solution was obtained to prepare a solution.

BPEF-A: bisphenoxyethanolfluorene diacrylate (manufactured by Osaka Gas Co., Ltd.)
US: urethane acrylate (NK Oligo U-15HA of Shin Nakamura Kagaku Co., Ltd.)
Irgacure 184 (manufactured by Ciba Geigy Co., Ltd.)
SH28PA (manufactured by Toray Dow Corning Co., Ltd.)

A plain woven fabric having a length of 40 cm, a width of 20 cm and a thickness of 40 μm was manufactured by using the PVA fibers adsorbing iodine as warp and the polyester fibers as weft. The fabric was totally immersed in the above prepared solution. The solution was cured by application of ultraviolet radiation from a high-pressure mercury lamp to obtain a polarizing plate having a thickness of 50 μm and comprising the fabric immersed and fixed in the optically transparent resin. At this point, the optically transparent resin had a refractive index of 1.58. The polarizing plate obtained as the above had a transmittance of 45.2% and a polarization degree of 99.9%.

When the angle having an amplitude showing the stereo-regularity of the PVA fiber was observed by sectional SEM, the maximum angle R formed by the plane (XY plane) of the polarizing plate and the thermoplastic resin fiber at a ¼ of the wavy cycle was about 40°. As the view angle characteristics of this polarizing plate, A (TΔ30%)=±80. It was thus confirmed that the polarizing plate had a wide view angle.

Reference Example 2

The view angle characteristics of the polarizing plate obtained in Reference Example 1 were measured. The view angle characteristics of the polarizing plate were A(TΔ30%)=±30°. It was thus confirmed that the polarizing plate had a problem with the view angle.

The invention claimed is:

1. A polarizing plate comprising (a) a plurality of polyvinyl alcohol fibers adsorbing a dichroic pigment and having an aspect ratio of 10 or more, which are arranged in a planar form in one direction, (b) a plurality of fibers having an aspect ratio of 10 or more and a difference between the refractive index of fiber in long axis and the refractive index of fiber in short axis of 0.05 or more and not adsorbing a dichroic pigment, which are arranged in a planar form in one direction, and (c) an optically transparent resin, wherein
the one direction where the plurality of fibers (a) are arranged and the one direction where the plurality of fibers (b) are arranged are the same or orthogonal to each other, when they are the same, the refractive index of fiber in short axis of the plurality of fibers (b) and the refractive index of the optically transparent resin (c) become almost the same and when they are orthogonal to each other, the refractive index of fiber in long axis of the plurality of fibers (b) and the refractive index of the optically transparent resin (c) become almost the same.

2. The polarizing plate according to claim 1 which further comprises (b') a plurality of fibers having an aspect ratio of 10 or more and a difference between the refractive index of fiber in long axis and the refractive index of fiber in short axis of less than 0.05 and not adsorbing a dichroic pigment, which are arranged in a planar form in one direction, wherein
the average value of the refractive index of fiber in long axis and the refractive index of fiber in short axis of the fibers (b') and the refractive index of the optically transparent resin (c) are almost the same.

3. The polarizing plate according to claim 1 which is in the form of a fabric woven by using either one of the plurality of fibers (a) and the plurality of fibers (b) as warp and the other fibers as weft in such a manner that the one direction where the plurality of fibers (a) are arranged and the one direction where the plurality of fibers (b) are arranged become orthogonal to each other.

4. The polarizing plate according to claim 1, wherein the plurality of fibers (a) and the plurality of fibers (b) are immersed and fixed in the optically transparent resin.

5. The polarizing plate according to claim 2, wherein the one direction where the plurality of fibers (a) are arranged and the one direction where the plurality of fibers (b) are arranged are the same, and the one direction where the plurality of fibers (b') are arranged is orthogonal to the directions of the fibers (a) and (b).

6. The polarizing plate according to claim 5 which is in the form of a fabric woven by using either one or both of the plurality of fibers (a) and the plurality of fibers (b) as warp or weft and the plurality of fibers (b') as warp or weft.

7. The polarizing plate according to claim 2, wherein the plurality of fibers (a), the plurality of fibers (b) and the plurality of fibers (b') are immersed and fixed in the optically transparent resin.

8. The polarizing plate according to claim 1, wherein the plurality of fibers (a) are wavy in the one direction where the fibers (a) are arranged and the thickness direction of the polarizing plate.

9. The polarizing plate according to claim 1, wherein the polyvinyl alcohol fibers comprises a polyvinyl alcohol resin having a polymerization degree of 1,000 to 40,000 and a saponification degree of 80 to 100%.

10. The polarizing plate according to claim 1, wherein the polyvinyl alcohol fibers have an average fiber diameter of 0.7 to 100 μm.

11. The polarizing plate according to claim 1, wherein the dichroic pigment is iodine.

12. The polarizing plate according to claim 1, wherein the fibers (b) have an average fiber diameter of 0.7 to 100 μm.

13. The polarizing plate according to claim 1, wherein the optically transparent resin (c) is a curable resin.

14. The polarizing plate according to claim 13, wherein the curable resin is an ultraviolet curable resin.

15. A polarizing plate roll which is a roll of the polarizing plate of claim 1, wherein the directions of the transmission axis and the absorption axis of the polarizing plate and the winding direction of the roll and a direction orthogonal to the winding direction are not the same.

16. An optical component comprising a polarizing layer composed of the polarizing plate of claim 1 and another optical layer showing another optical function different from polarization, wherein
when the plane where the plurality of fibers (a) are arranged and the plane where the plurality of fibers (b) are arranged are overlapped with each other in the thickness direction of the polarizing plate, the another optical layer is formed on the plane where the plurality of fibers (a) are arranged.

17. The optical component according to claim 16, wherein the another optical layer is a retardation layer.

18. A liquid crystal display device comprising the optical component of claim 16.

* * * * *